United States Patent [19]

Poorten

[11] Patent Number: 4,708,781
[45] Date of Patent: Nov. 24, 1987

[54] PROCESS OF SIMULTANEOUSLY PRINTING AND ELECTROFORMING CERAMIC ARTICLES

[75] Inventor: Henri V. Poorten, Mons, Belgium

[73] Assignee: Andromaque, S.A., Luxembourg, Luxembourg

[21] Appl. No.: 921,158

[22] Filed: Oct. 20, 1986

[30] Foreign Application Priority Data

Oct. 18, 1985 [LU] Luxembourg ............................. 86128

[51] Int. Cl.[4] .............................................. C25D 13/00
[52] U.S. Cl. .................................................. 204/180.9
[58] Field of Search ......................... 204/3, 4, 8, 180.9

[56] References Cited

U.S. PATENT DOCUMENTS 4,121,987 10/1978 Ryan ................................ 204/180.9

Primary Examiner—T. M. Tufariello
Attorney, Agent, or Firm—Robert E. Burns; Emmanuel J. Lobato

[57] ABSTRACT

A process of printing ceramic articles simultaneously with electroforming them to produce ceramic articles having patterns thereon comprises preparing a thin flexible diaphragm with a pattern thereon, applying the diaphragm to an electrode, immersing the electrode with the diaphragm thereon in a ceramic slip and applying electric current between the electrode as an anode and a counter electrode to deposit ceramic material on the electrode to form a green ceramic article to which the pattern is imparted by the diaphragm. The electrode with the diaphragm and green ceramic article thereon is removed from the ceramic slip and the diaphragm and article are together removed from the electrode. The article thus formed with the pattern thereon is thereafter dried and fired. The diaphragm is either left on the article and consumed during firing or is removed from the article before firing.

18 Claims, 4 Drawing Figures

PROCESS OF SIMULTANEOUSLY PRINTING AND ELECTROFORMING CERAMIC ARTICLES

This invention relates to a printing or coating process for use in fashioning ceramics by electrodeposition in accordance with the techniques forming the subject of Belgian patents 873 378, 880 993, 895 717 or alternatively with techniques for electroforming flat or hollow ceramics.

The particular characteristic of this process is that it can be effected at the same time as the fashioning operation and therefore results, with a single firing, in finished decorative ceramic products, for building, refractories, technical ceramics for electrical, electronic, mechanical, thermal purposes, of glass ceramic or neoceramic.

The electroforming techniques to which the various versions of the printing process to be described apply, are quite specially techniques proceeding through the intermediary of diaphragms, whether ion-exchange or not, functioning discontinuously or continuously.

In a general way, this process consists of fashioning ceramic items on flexible, rigid, or semi-rigid material permeable to ions and through which passes a current generated by a direct voltage between electrodes (one anode and one cathode) situated on opposite sides of the diaphragm. On the anode side, the operation proceeds by means of an ordinary or gelated electrolytic solution or one permeating a porous structure (felt for example).

The nature of the diaphragms will be indicated later; in all cases they will constitute provisional formation aids.

The characteristics of formation by electrodeposition as compared with other techniques of forming in ceramic are given in the above-mentioned patents.

The systems of printing and decoration currently used in ceramics are so very varied that it is not possible to consider all of them and reference can be made to the numerous specialist works. John W. Conrad's book, "Contemporary Ceramic Techniques", published in 1979 by Prentice-Hall Inc. in USA (New Jersey) notes recent ceramic decoration techniques. The book also has an abundant bibliography of the subject on pages 173 to 177.

The most general and commonest characteristic of all decoration or coating techniques used today in ceramics is the fact that they are employed in the course of operations after the product has been shaped.

Certain relief printing techniques, the introduction of enamel or other powdered component into the shaping process by pressing in molds (the technique of porcelain inlay) are indeed used in ceramics. But this is far from being the general rule. Moreover, the subject of this invention relates less to supplying reliefs than to decoration in the form of motifs reproduced on the surface of electroformed pieces.

The production of ceramics with relief using electroforming has been described in the previous patents quoted above.

In the present invention, a certain number of printing techniques known to ceramics, following documents on textiles, are adapted to forming by electrodeposition with the particular new characteristic of effecting printing and forming in a single operation, necessarily resulting in consequence in a single firing step (single-fired).

It will be noticed that even traditional single-firing applies to ceramic objects the shaping, glazing and decoration of which as an unfired product are carried out in at least two distinct operations.

For each of the techniques proposed here, the basic principle relates to the use of an intermediate aid to electroforming. Silk-screen electroforming is first envisaged, which starts from a silk-screen process to prepare or make the diaphragm to be used in electroforming the decorated ceramic.

For flat or slightly curved ceramics (plaques, tiling, pannelling), this technique consists of preparing the diaphragms used in electroforming the ceramics by traditional silk-screen methods with ceramic inks or powders (enamels, glazes, oxide dyes). Ceramic inks are based on absorbent bonding agents such as carboxy methyl cellulose, starches, etc. . . and powders should absorb water (oxides, hydroxides, carbonates, sulphides, etc. . . ) and on firing, result in a glaze or colouring of the ceramic piece to make a design.

Materials to be printed by the silk-screen method may be of two types: sacrificial or permanent.

As regards sacrificial materials, the diaphragms will accompany the electroformed ceramic pastes to the firing chamber and will be consumed by combustion leaving no trace. Only ceramic inks or powders applied by silk-screen and transferred on the paste will subsist on the fired ceramic. Cellulose paper materials may be used, or cellophane films of low ash content.

Practically all the materials of this type having the property of being sufficiently absorbent to water and permeable by the ions leaving the anode can be used. Combustible materials will preferably be selected which can retain sufficient mechanical strength in the humid state and show least dimensional change in the presence of water.

Such materials, once printed, are applied cautiously to the forming electrode, - taking care to ensure good contact at all points, that is to say, avoiding any air bubbles or folding of the diaphragm.

The best way to proceed is to apply the printed diaphragm, the printing ink previously dried, on the electrode moistened with water or with an aqueous solution of polyvinyl alcohol. To ensure transfer of the motif on the paste, it is necessary that the printing of the diaphragm should be on the side where the paste is formed, that is, on the side of the diaphragm opposite that of the electroforming electrode.

Application of the diaphragm printed by silk screen printing should be effected with a flexible roller with a hydrophobic coating and in a very gentle manner in order not to alter the motif.

The thickness of the inking and powdering through the process screen will be adjusted according to the nature of the decoration elements (glazes, underenamel, dyes, etc. . . ) the effects to be obtained after firing, the nature of the ceramic, the strength of adhesion of the inks or powders to the material being printed.

The nature of the electrode to which such materials are applied and the conditions of electrolysis will be selected in such a way as to avoid releases of oxygen liable to interfere with the electroforming of the articles. Zinc will be specially advantageous when it is desirable to avoid any colouration of the ceramic other than that effected by silk screen printing.

But tin, aluminum, iron, cobalt, copper, chrome, lead and alloys of uniform anodic solution can also be used. Generally, current density will range from 5 to 15 $mA/cm^2$, and voltages from 10 to 15 volts/cm. The composition of the ceramic slip for electroforming should not have any special characteristics as compared with the indications given in the patents quoted above as reference for electroforming.

For technical applications (mechanical, resistance to abrasion, electronic or electrical engineering, thermal) the method using screen process printing can be employed for coating, whether uniform or not, of ceramic articles. In this way, thin coatings can be achieved in accordance with any design using constituents such as alumina, zirconia, zircon, silicon carbonate, stannous oxide, mullite, sillimanite, applied to ceramic articles very varied in nature and capable of being formed by electrodeposition.

For applications in the manufacture of heating elements, or ceramic absorbents of solar radiation, the active components can be provided by the technique forming the subject of this invention. In certain cases, the doping element in effecting the semi-conductivity of surface-active compounds can be provided by the anode used for electroforming. In this way, the stannous oxide previously deposited by screen printing on the electro-deposition diaphragm can be doped with copper by fixing the latter on a copper electrode. The electroformed ceramic article will consequently include, after firing, a semi-conducting surface film, whether uniform or distributed according to any given pattern.

By subsequent application of electric leads, heating elements can be made with heat-resisting materials.

Electric circuits on dielectric substrates can be made in this way following a design prepared in accordance with the traditional requirements of silk screen printing. Should transfer of the design, when drying and firing, be effected imperfectly, it is possible to improve the transfer after separating the forming electrode.

The ceramic paste is separated from the electrode by the printed diaphragm, on which it is recovered for the drying and firing operations. Before drying, transfer of the design can be improved by means of a roller applied to the side of the diaphragm in such a way as to impregnate such design into the soft paste. A solvent can also be sprinkled on the upper surface of the diaphragm to facilitate release of the printed pattern and transfer to the paste. The solvent is selected according to the nature of the ceramic ink employed in the prior silk-screen operation.

In some cases, it is possible to withdraw the diaphragm before drying and firing when full transfer of the motif to the ceramic paste has taken place. If the diaphragm can be eliminated in this way before drying and firing, this is the best way to operate and to be absolutely sure that neither the drying nor subsequent firing treatments cause printing of the pattern to be disturbed.

As regards non-sacrificial, permanent materials, textile cloths (artificial or natural fibres) are employed, to which are applied the motifs to be printed by the silk screen method. In such case, it is essential that the motif should be carried directly by the paste electrodeposited on such cloths when lifting takes place from the mold.

The means cited above in the case of sacrificial diaphragms for improving or guaranteeing transfer of the motif (roller, solvent) are perfectly suitable in this case.

In discontinuous electroforming systems, it is possible to use separate pieces of cloth applied to the forming electrode. The cloths can also be mounted on frames such as those used in screen printing. In continuous systems where the electrode consists of a cylinder revolving in the ceramic slip the cloth consist of a continuous ribbon receiving the silk screen imprints before contact with the electrode and before entering the electrolytic cell.

As electrodeposition of paste is naturally effected in such cell, the printed cloth carries the paste outside the cell and it is lifted with the imprinted motif before cleaning and reprinting of the band. The system may be considered as a "step by step" progression, in such manner that the silk-screen printing time corresponds to the duration of the electrolysis, the band of cloth forming a continuous endless ribbon.

The same metal electrodes will be used and in the same conditions as those mentioned for sacrificial diaphragms.

It is also possible to introduce into such impregnation electrolyte, elements capable of improving the transfer of printing inks such as alcohols or any other solvents present in the ceramic inks used in silk-screen printing operation. It is essential that the binding elements in these inks should be hydrophilic in nature such as starches, cellulose sizes, carboxymethylcellulose. It is also possible, as a variant, to use silk-screen printing in a more indirect manner, using decalcomania papers or "transfer" elements (transfer letters type) previously prepared by silk screen printing.

In such case, it is necessary that the inks used for such decalcomania papers or transfers should be hydrophilic and, for the thicknesses employed, retain permeability to ions sufficient to ensure electrodeposition, as in the cases previously mentioned.

In this variant, these "pre-fabricated" elements of decoration are first transferred from the material on which they are printed to the sacrificial or permanent diaphragms for electroforming. The latter are inserted into the electoforming cells.

Naturally, this technique can also be envisaged as advance preparation of the diaphragms with motifs to be transferred. In such case, the material on which the decalcomanias (or transfers) are printed must be chosen in such a way that they can act directly as electrodeposition diaphragm and that the decoration motifs in ceramic inks are indeed carried by the ceramic paste electroformed on such material.

Moreover, in regard to continuous or discontinuous processes of electro-forming ceramics with a diaphragm, the latter may naturally be pre-printed using traditional inking techniques, namely, engraved or perforated rollers externally or internally fed with ceramic inks or alternatively using the offset technique with these same ceramic inks.

From non-planar ceramics, the printing concerned will be indirect and effected according to the preceding technique, consisting of first creating a fine coating ($\pm 2$ mm) of paste with the desired imprint followed by sizing as a soft paste to the non-planar ceramic article. Such bonding can be effected using adhesive ceramic slip on objects formed by electrodeposition (as described in the patents on electroforming hollow objects) or other forming techniques.

More generally, as will be apparent to the person skilled in the art, the technique of the present invention permitting enamel or similar inorganic material being incrusted in the ceramic material before firing present various advantages. For example the relief of the end product will generally be such that the decorative enamel will be protected and less fragile as it is incrusted in the ceramic and not superimposed. This will also avoid mixing of different kinds of enamels in the boundaries, an effect encountered with the traditional methods.

Another version of the process consists of carrying out electro-forming with stencils. By definition, the stencils consists of a screen in which holes have been made generally intended to permit printing ink to pass.

For electroforming effected on a diaphragm, it is possible to use a stencil by way of a diaphragm to be placed on the forming electrode.

There is consequently a diaphragm of locally variable permeability which has the effect of giving slight extra thicknesses of electrodeposit opposite the apertures. This has the effect of reproducing a visible motif on the one hand by slight embossment and on the other, more marked colourations with chromogenous anodes, the latter emitting more colouring ions opposite the apertures.

This method has several variants according to the nature of the stencil, the perforation technique, the nature of the anode and the nature of the applications.

As regards the application with electroforming, the subject-matter of this invention, the stencils must be hydrophilic and have ion conductivity since the stencils are used as a diaphragm in a electrolytic cell fixed on the anode, and they constitute the seat of formation of the ceramic.

Ordinary paper stencils are generally hydrophilic and permeable by ions.

It is therefore possible to effect electroforming through the stencil as a whole, giving preference to the areas cut away or perforated. The degree of embossment obtained depends on the thickness of the paper, its ion conductivity, and the area of the apertures.

Stencils made of material which is hydrophobic and impermeable by ions permit electrodeposition solely opposite the open parts. This type of stencil is ideally used to produce ceramic articles of open-work design, small fine ceramic independent units of whatever shapes, using very localized perforations.

To make open-work ceramic structures such as honeycomb or "cloisters", it is naturally necessary to have stencils with a continuous network of perforated zones so that electroforming does not produce separate pieces. Thicknesses of such open-work structures may range from ±1 mm to ±10 mm. Greater thicknesses may be obtained by sticking several units to the ceramic slip before drying.

It is possible to use stencils which are generally more solid than paper ones, to make continuous ceramic pieces with a slightly embossed imprint, by perforating the stencil with small apertures (maximum 0.1 mm) but very regularly distributed. It is in this way, in conventional printing reproduction on a traditional printer, that "gray backgrounds" are obtained. Additional perforations produce the pattern by overprinting. In a certain way, a "screen" is made which forms a continuous ceramic piece of relatively constant thickness.

Ordinary paper stencils can generally be used only for a limited number of ceramic articles. Their useful life can be increased by covering them with a cellophane membrane. In such case, the stencil remains fixed to the electrode and the ceramic deposit with imprint is recovered on the cellophane film.

Photographic stencils can be used such as those conventionally employed in silk-screen printing for printing on paper or fabric. Pre-sensitized films are used or carbon fabrics sensitized with potassium dichromate (see details on photographed stencils in the above-cited work by J. W. Conrad). To be used in the context of electroforming ceramic articles without holes, are motifs of the "half-tone" type generally obtained with a screen or with film pre-exposed through a screen in such a way that, on development and fixing, there is general permeability to ensure relatively uniform electrodeposition. The motif will emerge against a continuous background.

Such films at the start generally require a diapositive. If a small size diapositive is involved, an enlarger or projector will be required to print the stencil film. With large-size diapositives, the procedure is with contact prints in a device under vacuum or by simple pressing as in an ordinary printer.

It should be noted that in such process where ceramic is printed by stencil and electroforming, motifs for which direction is important (texts, for example), have to be reproduced on the stencil with the motif in the reverse. This is generally true of all techniques forming the subject-matter of this invention.

The simplest method of perforation of the stencil using stencils consisting of ordinary sheets of paper or any other thin, hydrophilic, ion-conducting material, consists of cutting out with a cutter or with an automatic stamping machine for rather more complicated motifs.

It is also possible to use machines perforating mechanically or electronically according to any given model. A traditional electronic stencilling machine is perfectly suitable. They are generally designed for small sizes such as A4. But their design principle can be applied in making stencils of larger sizes. With or without screen photographing, very complicated designs can be reproduced with very fine detail.

Photographic stencils have been mentioned above which may have been made using a screen-photographed diapositive or not, and the perforations in which are made by suitable reagents according to the areas exposed to the light or not.

Variants are possible according to the nature of the anode. They can be obtained for example with a non-colouring anode such as zinc; the impression obtained on the electroformed ceramic in such case, is mainly visible through the slight embossment corresponding to the perforated parts of the stencil.

Before withdrawing such stencil with a view to drying and firing, it is nevertheless conceivable that one or more dyes (ceramic inks, enamel slips, oxide suspension dyes) may be applied, which will lead to colouration corresponding to the open areas of the stencil.

The stencil is withdrawn before drying and firing. With chromogenous anodes such as cobalt, iron, chrome, nickel, copper, lead and alloys, coloured motifs (monocolouration) may be directly obtained through the intermediary of colouring ions which are present in greater concentration opposite open areas of the stencil.

The diffusion of chromogenous ions in the ceramic electrodeposit often prevents very clear images being obtained.

But in some cases, and with motifs without too much fine detail, the effect obtained is very successful.

For technical applications (electronic or electrical engineering), the effects obtained by this technique can be used to distribute ions according to varied patterns in ceramic materials (circuits printed on ceramic substrate).

As for the silk-screen printing technqiue of electro-forming, the electro-forming technique on the stencil can be used for flat (or slightly curved) ceramic objects or for hollow objects. In the latter case, thin coatings are made with the imprints and they are stuck with adhesive ceramic slip on the wet paste ceramics.

Electroforming with electrostatic imprints can also be applied. This third version of the process of ceramic manufacture by electroforming with simultaneous printing, uses materials previously printed by high tension electrostatic processes.

In this version of the process, a paper or fabric material is used which is suitable both as a diaphragm for electroforming and as material to print a pattern by "corona" effect with a mineral-pigment-based ink.

The printing technique may be inspired from that employed in "photocopying machines", comprising the following main phases:

Preconditioning exposure on a photosensitive drum.
General loading of the drum by corona effect.
Exposure of the motive to be reproduced and creation of the latent image.
Electrostatic development of such latent image using a developing cylinder; the ink should be magnetic mineral based capable, after transfer to the ceramic paste and firing, of reproducing the pattern.
Transfer of the ink from the surface of the photosensitive drum to the paper or fabric.
Fixing the image by the controlled effect of pressure and heating.

The general technique being that traditionally operated in photocopying machines, it will not be given in detail.

Adapting this general technique to the process forming the subject-matter of this invention should be effected in the following respects:

The ink should be mineral pigment based (magnetic oxides, ferrites or other mineral with magnetic properties).

The tranfer should be made on an absorbent material, permeable by ions.

Fixing the image should not be pushed too far because the image formed of ceramic ink should be easily transferable to the electroformed ceramic paste.

Feed to the reproducing device should be operable with the material in a roll to ensure continuous supply to machines.

This process therefore consists of using the material including the electrostatic print consisting of ink to subsequent decorative effect on the ceramic and of using such material as an electroforming membrane in the electrodeposition cell and of recovering the ceramic article formed on such material.

Subsequently, there are different ways of operating. Either the ceramic paste is dried and fired with the membrane. In such case, the material should remain completely adherent to the article in the course of drying and firing, tranfer of the image should take place before combustion of the material.

Then there is the technique of sacrificial material. In certain cases, it is preferable to eliminate the material before drying and firing. In such case, the image should first be transferred to the ceramic paste with the aid of a solvent suited to the type of ink employed (for example, acetone alcohols, carbon tetrachloride, dimethyl formamide) and a roller to facilitate adhesion of the image to the paste.

This technique of transfer of the decorative motif to the paste is naturally inevitable where a permanent material (fabric) is used, suitable, after cleaning, for re-use for printing and electroforming.

Use of this process can be envisaged in the continuous and discontinuous ceramic electroforming techniques forming the subject-matter of the patents on electroforming cited, in all cases where the technique is employed with electrodes provided with diaphragms.

By using inks containing mineral dye pigments or different coloured glaze elements, and employing the technique of colour photocopying, it is possible to adapt the process to the manufacture of ceramics with multi-coloured motif.

Thanks to this last technique based on the use of electrostatic images, the extremely faithful reproduction of very detailed lined motifs, in half-tone, photo-patterned, which it can produce on ceramics while at the same time forming the latter, the technique of electroforming previously patented by the inventor is considerably enhanced in value as compared with traditional techniques of ceramic forming and decoration. It is not only no longer necessary to have recourse to the traditional decalcomania papers, but simultaneous forming and decoration can be effected on ceramic plates of a size which may be as great as $75 \times 120$ cm. Such performance is linked both with the electroformng processes and the simultaneous printing proceses of the present invention. Reproduction of large pictures in the form of ceramic panels in a single piece therefore becomes feasible.

The technique of the invention as generally described above is hereunder exemplified in a non-limitative way taking reference to the accompanying drawings, in which.

The process in accordance with the invention will appear further from the following examples:

EXAMPLE 1

Electroforming with electrostatic imprint:

Electroforming with electrostatic imprints can be performed with ordinary photocopying machine with black ink containing magnetic iron oxide ($Fe_3O_4$), using ordinary paper for photocopy used as a sacrificial membrane. The photocopy is placed on a wet zinc plate, the electrostatic image being on the free side of the photocopy. The zinc plate with the photocopy is introduced in the electrolysis cell as the anode. The electrolysis is performed at 30 votls (15 volts/cm). 7 mA/cm2 during 10 minutes in a ceramic slip containing classical porcelain composition. The ceramic paste with attached photocopy is then separated from the zinc plate. Drying and firing are carried out in classical conditions for porcelain composition using an electrical kiln. Ceramic printed plates of 3 to 6 mm thickness are obtained.

EXAMPLE 2

Electroforming with stencils:

There is used a Gestetner 1753 electronic stencilling machine (electronical graving) and a stencil made of polyvinyl (Faxil 100 ID, Gestetner). The model is a continuous hexagonal compact network of perforated zones (honeycomb motif). The perforated stencil is placed on a wet zinc plate. The zinc plate with the stencil is introduced in the electrolysis cell as an anode, electrolysis occuring at 30 volts (15 volts/cm), 7 mA/cm2 during 10 minutes in a ceramic slip containing for instance 34% water, 22% kaolin, 22% clays and 22% feldspath. The stencil is then peeled off from the openwork ceramic structure (thickness 5 mm) which is dried and fired under classical conditions.

EXAMPLE 3

Silk screen electroforming (discontinuous)

Figure 1:
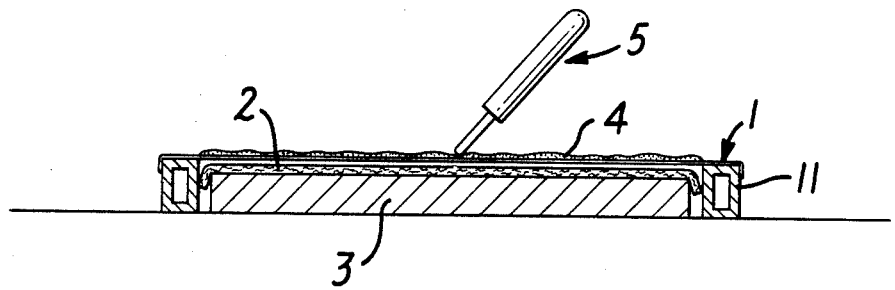
FIG. 1 is a schematic vertical section illustrating the preparation of a membrane.

A silk screen 1 with nylon 100 mesh on frame 11 is used, the receiving membrane 2 being in contact with a plate of copper 3 as base and as the electroforming anode as illustrated in FIG. 1. A ceramic ink 4 is used with the following composition:
50% dry material : enamel, glaze or stain (ball-milled)
10% carboxymethylcellulose as vehicle
40% water This ceramic ink is first passed through a 200 mesh screen. The above membrane is made of cellulose fibers with kaolin charge (e.g. ordinary paper).

Figure 2:
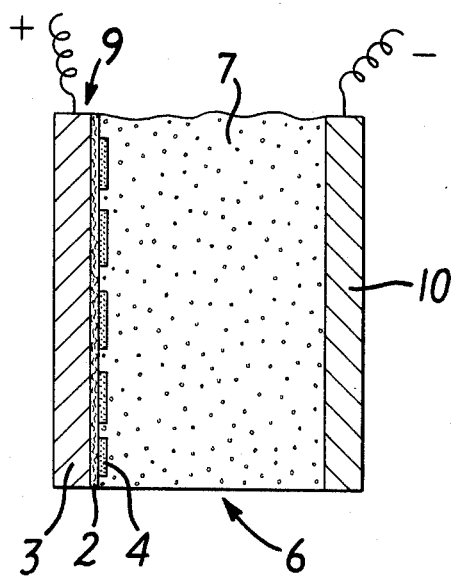
FIG. 2 is a schematic vertical section of an electrolysis cell for forming a ceramic article in accordance with the invention.
Figure 3:
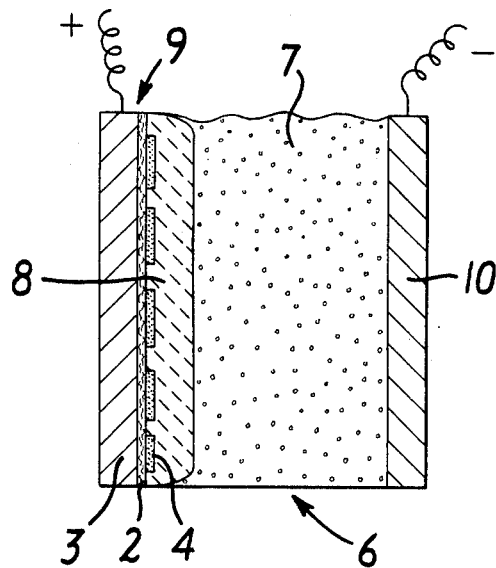
FIG. 3 is a schematic vertical section of the electrolysis cell after ceramic paste has been electrodeposited on the membrane to form an article.
Figure 4:
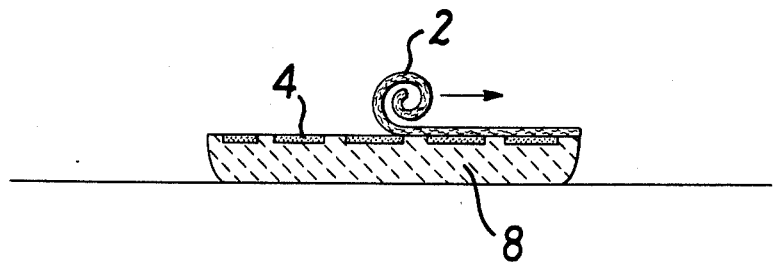
FIG. 4 is a side elevation of the article after it has been removed from the cell.

Once the ink is deposited on the membrane using a squeegee 5 and the well-known silk-screen technique, the copper electrode 3 with the printed membrane 9 in a wet state is introduced in the electroforming cell 6 having a cathode 10 as illustrated in FIG. 2. Electrolysis is carried out at 30 volts. 7 mA/cm2 during 15 minutes in a ceramic composition 7 containing 34% water, 22% Koalin, 22% clays and 22% feldspath to produce a deposit 8 of ceramic paste on the membrane as illustrated in FIG. 3. The membrane supporting the ceramic paste 8 is first separated from the copper anode and then peeled off the paste as illustrated in FIG. 4 the ceramic ink remaining incrusted in the pasty ceramic deposit. Drying and firing are carried out in classical conditions that is to say drying progressively from 20° C. to 110° C. and firing to 1180° C.

What I claim is:

1. A process of printing ceramic articles simultaneously with electroforming them to produce ceramic articles having patterns thereon, said process comprising the steps of:
   preparing a thin flexible diaphragm with a transfer pattern thereon,
   applying said diaphragm to an electrode,
   immersing said electrode with said diaphragm thereon in a ceramic slip,
   applying electric current between said electrode and a counterelectrode with said electrode as an anode to deposit ceramic material on said diaphragm on said electrode to form a green ceramic article, the design of said diaphragm being imparted to said article,
   removing said electrode with said diaphragm and said article thereon from said slip and removing said article and diaphragm together from said electrode, and
   drying and firing said article with said pattern thereon.

2. A process according to claim 1, in which said pattern is defined on said diaphragm by a multiplicity of small perforations.

3. A process according to claim 2, in which said diaphragm is hydrophobic and impermeable by ions.

4. A process according to claim 2, in which said diaphragm is hydrophilic and permeable by ions.

5. A process according to claim 2, in which said perforations are uniformly distributed and have a maximum size of 0.1 mm.

6. A process according to claim 1, in which said diaphragm is wettable and permeable to ions and in which said pattern is defined with ceramic ink comprising fine heatresisting powder with a bonding agent, said diaphragm being applied to said electrode with said pattern facing away from said electrode.

7. A proces according to claim 6, in which said powder is a mineral pigment.

8. A process according to claim 6, in which said powder is a ceramic powder.

9. A process according to claim 6, in which said powder is electrically conductive.

10. A process according to claim 6, in which said pattern is applied to said diaphragm by a silk screening process.

11. A process according to claim 6, in which said pattern is applied to said diaphragm with a printing roller.

12. A process according to claim 6, in which said pattern is applied to said diaphragm with an engraved roller.

13. A process according to claim 6, in which said pattern is applied to said diaphragm by offset printing.

14. A process according to claim 6, in which said pattern is applied to said diaphragm by forming on said diaphragm a latent electrostatic image and then applying said powder.

15. A process according to claim 1, in which said diaphragm is left on said article and is consummed during firing of said articles, said pattern being left on said article.

16. A process according to claim 1, in which said diaphragm is removed from said article before firing of latter, said pattern being left on said article when said diaphragm is removed.

17. A process according to claim 1, in which a solvent is applied to said diaphragm after removal of said diaphragm and article from said electrode to further transfer of said pattern from said diaphragm to said article.

18. A process according to claim 1 in which pressure is applied to said diaphragm after removal of said diaphragm and article from said electrode to further transfer of said pattern to said article.

* * * * *

UNITED STATES PATENT AND TRADEMARK OFFICE
CERTIFICATE OF CORRECTION

PATENT NO. : 4,708,781
DATED : Nov. 24, 1987
INVENTOR(S) : Henri VANDER POORTEN

It is certified that error appears in the above-identified patent and that said Letters Patent is hereby corrected as shown below:

On the Title page, item [75] is corrected to read:

[75] Inventor: Henri VANDER POORTEN

Item [19]: "Poorten" should read --Vander Poorten--.

Signed and Sealed this

Twentieth Day of March, 1990

Attest:

JEFFREY M. SAMUELS

*Attesting Officer*    *Acting Commissioner of Patents and Trademarks*